United States Patent [19]

Kobayashi et al.

[11] Patent Number: 4,617,656

[45] Date of Patent: Oct. 14, 1986

[54] INFORMATION TRANSMISSION SYSTEM WITH MODEMS COUPLED TO A COMMON COMMUNICATION MEDIUM

[75] Inventors: Hiroshi Kobayashi; Tsuguhiro Hirose, both of Tokyo; Hideaki Haruyama, Fujisawa, all of Japan

[73] Assignee: Tokyo Shibaura Denki Kabushiki Kaisha, Kawasaki, Japan

[21] Appl. No.: 814,598

[22] Filed: Jan. 2, 1986

Related U.S. Application Data

[63] Continuation of Ser. No. 563,241, Dec. 19, 1983, abandoned.

[30] Foreign Application Priority Data

Dec. 22, 1982 [JP] Japan .............................. 225216/82

[51] Int. Cl.⁴ .......................... H04J 1/02; H04J 3/12
[52] U.S. Cl. ........................................ 370/74; 370/98
[58] Field of Search .................. 370/74, 124, 98; 375/42, 36, 8, 37; 455/70, 68

[56] References Cited

U.S. PATENT DOCUMENTS

| | | | |
|---|---|---|---|
| 2,300,415 | 11/1942 | Green | 455/68 |
| 4,007,449 | 2/1977 | Vercesi | 375/8 |
| 4,092,596 | 5/1978 | Dickinson et al. | 370/74 |
| 4,251,881 | 2/1981 | Rvether | 370/98 |
| 4,271,503 | 6/1981 | Eumvrian et al. | 370/74 |
| 4,281,380 | 7/1981 | Demesa, III et al. | 370/85 |
| 4,281,408 | 7/1981 | Bonnerot | 370/74 |
| 4,375,691 | 3/1983 | Hackett | 375/8 |
| 4,411,004 | 10/1983 | Graham | 375/8 |
| 4,425,664 | 1/1984 | Sherman et al. | 375/8 |

OTHER PUBLICATIONS

IEEE 802 Local Network Standard, Draft B, Chapter V.2, 8.0, Appendix, Method C, Oct. 19, 1981.

Primary Examiner—Douglas W. Olms
Assistant Examiner—Curtis Kuntz
Attorney, Agent, or Firm—Oblon, Fisher, Spivak, McClelland & Maier

[57] ABSTRACT

A plurality of information processors are coupled by respective modems to a communication medium at points thereof. Transmission and reception of information signals among the modems are effected through a headed located at a predetermined point on the communication medium. A pilot signal generator is provided which sends out a pilot signal having a predetermined reference level through the headend to the communication medium. Each modem is arranged to properly adjust the gain of its transmitting amplifier according to a reception level of the pilot signal for an improvement of signal transmission quality and a reliable detection of a signal collision.

30 Claims, 19 Drawing Figures

F I G. 15
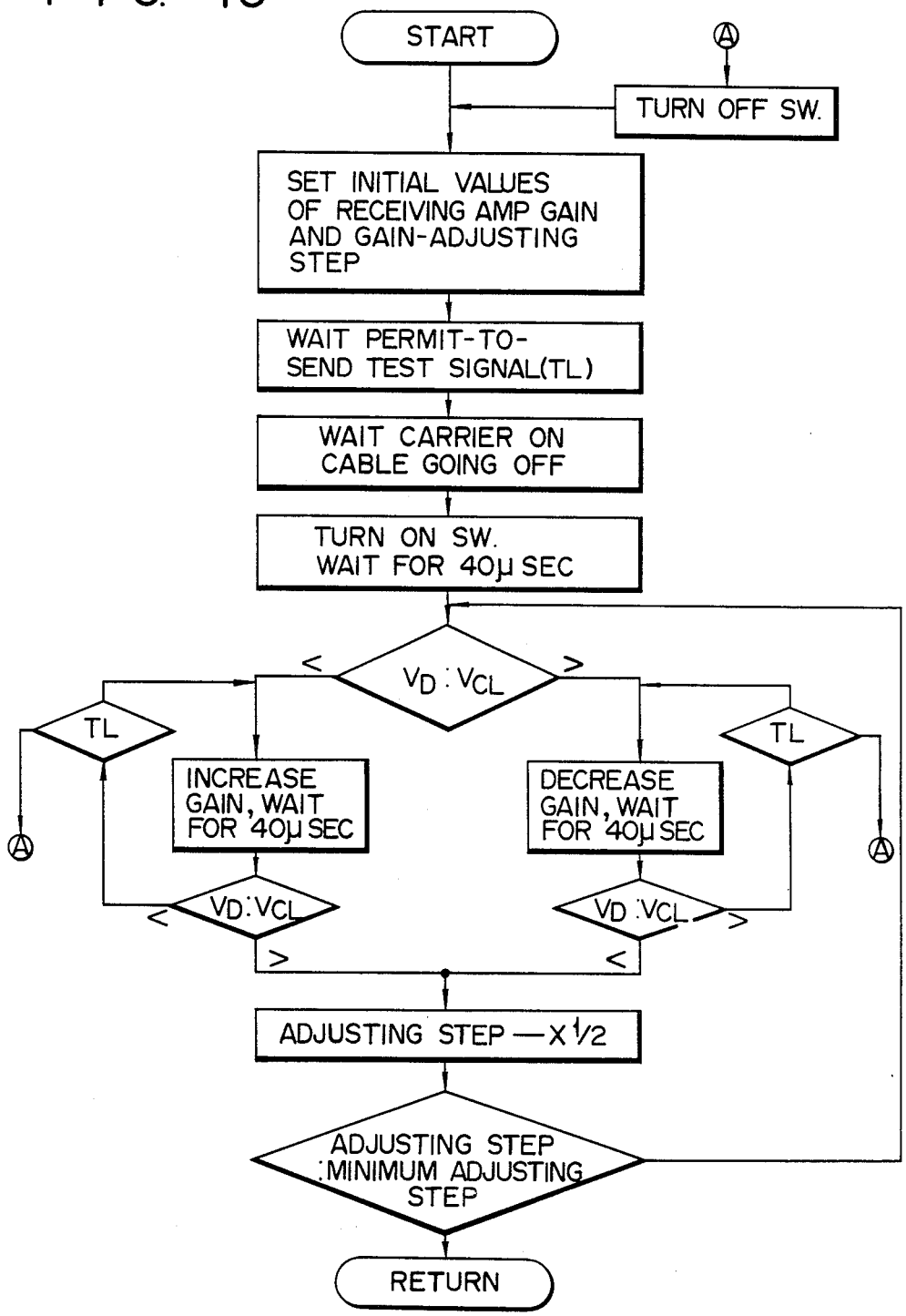

INFORMATION TRANSMISSION SYSTEM WITH MODEMS COUPLED TO A COMMON COMMUNICATION MEDIUM

This application is a continuation, of application Ser. No. 563,241, filed Dec. 19, 1983 now abandoned.

BACKGROUND OF THE INVENTION

This invention relates to an information transmission system, which permits information transmission and reception among information processors connected to a communication medium via interfaces.

A fully distributed peer protocol transmission system or CSMA/CD (carrier sense multiple access with collision detection) system is well known in the art as a bus-shaped network, which does not require any central control station and is readily capable of extension. The system effects baseband transmission via a coaxial cable as a communication line. Recently, in order to improve the efficiency of utility of the coaxial cable, broadband networks are being developed, in which a baseband signal is converted into a carrier transmission signal.

When realizing a CSMA/CD system on a carrier transmission line, it is significant to ensure collision detection characteristics substantially comparable with those on the conventional baseband transmission line and also ensure compatibility with upper protocols.

To meet collision detection characteristics requirements, there are some approaches.

In a first approach, transmitted data is temporarily stored and collated bit by bit with data returned via a transmission line. If the two data are identical for all bits, it is assumed that the data has been transmitted without collision. If the two data differ even for a single bit, it is assumed that a collision has occurred. This system is referred to as bit collation system of transmitted and received data.

In this system, however, it is necessary to demodulate and decode the received signal to obtain received data and also store the transmitted data. This means that, in order to ensure the compatibility with upper protocol, part of functions of upper protocol must be effected by physical levels of lowest protocols. This will complicate the construction and increase cost of a modem as hardware which realizes the physical level. With this system, since the levels of received signals are not equal, when a modem, which transmits a relatively high level signal, receives at the same time this signal and a signal from another modem which transmits a relatively low level signal, the received low-level signal may be neglected so that a bit error or errors cannot be detected. Namely, 100% reliable collision detection cannot be attained. Further, the system cannot determine how many collisions occur while monitoring the traffic of the network. This poses a problem in connection with the control of network.

In a second approach, a modem which intends to transmit data sends out two pulses at a random time interval prior to data transmission and monitors the transmission line for a period of time two times the maximum propagation time of the transmission line from the point of time at which the first pulse is sent out. If only two pulses are received during the period of time, it is assumed that no collision has occurred so that data transmission is commenced. This system is called "random pulse monitoring system".

This system, however, requires a time of monitoring for any collision every transmission of a data packet. This reduces the transmission efficiency, i.e., effective transmission capacity, of the network. Besides, like the first system, to ensure the compatibility with upper protocols, the modem is required to store data to be transmitted from the upper protocol while monitoring two random pulses. This complicates the hardware of modems.

In a third approach, the detection of a collision is done using a fact that a peak level of a beat signal resulting from an overlapping of two signals transmitted from different modems is doubled when the two signals are in phase, for instance. This system is called "signal level detection system". This approach is free from the drawbacks in the previous first and second approaches, i.e., the incapability of collision detection by a receiving modem and the reduction of the network efficiency.

In this system, however, signals transmitted from all the other modems must be received through the transmission line by any modem at an equal and stable level. If the levels of the received signals are different, it becomes difficult to decide the occurrence of a collision.

From the standpoints of the signal transmission quality and collision detection in the CSMA/CD system, it is very important to receive at an equal reception level signals transmitted from all the interfaces.

SUMMARY OF THE INVENTION

An object of the invention is to provide an information transmission system, in which information processors are coupled through modems to a communication medium at points thereof, which enables any modem to receive signals from other modems at a substantially equal level for a reliable detection of a signal collision on the medium resulting from a simultaneous transmission of signal from modems.

The invention is applied to a local area network, which comprises a communication medium, a plurality of information processors and a plurality of modems coupling the respective information processors to the communication medium at points thereof for permitting transmission and reception of information signals among the information processors through a predetermined point of the communication medium.

Each modem includes a transmitting amplifier for sending out an information signal from the corresponding information processor to the communication medium and a receiving amplifier for receiving an information signal sent out from other modems to the communication medium.

According to the invention, a pilot signal generator is provided which supplies a pilot signal of a predetermined reference level to the communication medium. Each modem further includes a reception level detector for detecting the level of an output signal of the receiving amplifier, and gain adjusting means for adjusting the gains of the receiving and transmitting amplifiers according to the output signal of the detector when the pilot signal is received.

BRIEF DESCRIPTION OF THE DRAWINGS

FIGS. 12 through 16 are flow charts for explaining the operation of the gain controller shown in FIG. 10;

DETAILED DESCRIPTION OF THE PREFERRED EMBODIMENTS

Figure 1:
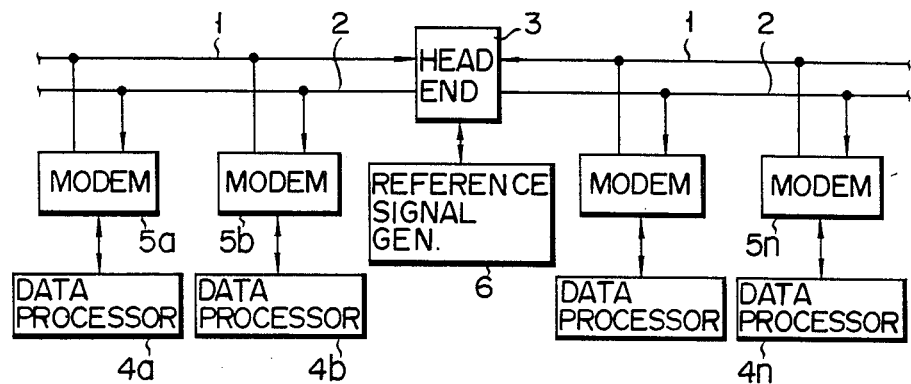
FIG. 1 shows a local area network using a coaxial cable according to the invention.

FIG. 1 shows a network embodying the invention. Reference numeral 1 designates a transmission line, and 2 a reception line. These lines 1 and 2 are coupled together at a given point by a headend 3 which comprises directional couplers and an amplifier. In the headend 3, a signal on the transmission line 1 is coupled to the reception line 2 through the couplers and amplifier. A plurality of data processors 4 (4a to 4n) are connected via respective modems 5 (5a to 5n) as interfaces to the lines 1 and 2 at arbitrary points thereof. Although not shown, each modem 5 is connected to the lines 1 and 2 by directional couplers. Data transmitted from a data processor 4 is thus coupled by the associated modem 5 to the transmission line 1 and then coupled by the headend 3 to the reception line 2 to be received by each modem 5, which in turn applies the received data to the associated data processor 4. Data transmission between the data processors 4 is effected in this way. A reference level signal (i.e., pilot signal) generator 6 is connected to the headend 3.

The pilot signal generator 6 sends out a pilot signal of a reference level through the headend 3 to the receiving line 2 at a fixed time interval or a time interval depending on the traffic of the line, i.e., at proper timings. The duration of the pilot signal is set sufficiently long compared to the maximum data packet length to (e.g., 1.2 msec.), e.g., 5 msec. The gains of receiving and transmitting amplifiers in each modem 5 are adjusted according to the pilot signal.

Figure 2:
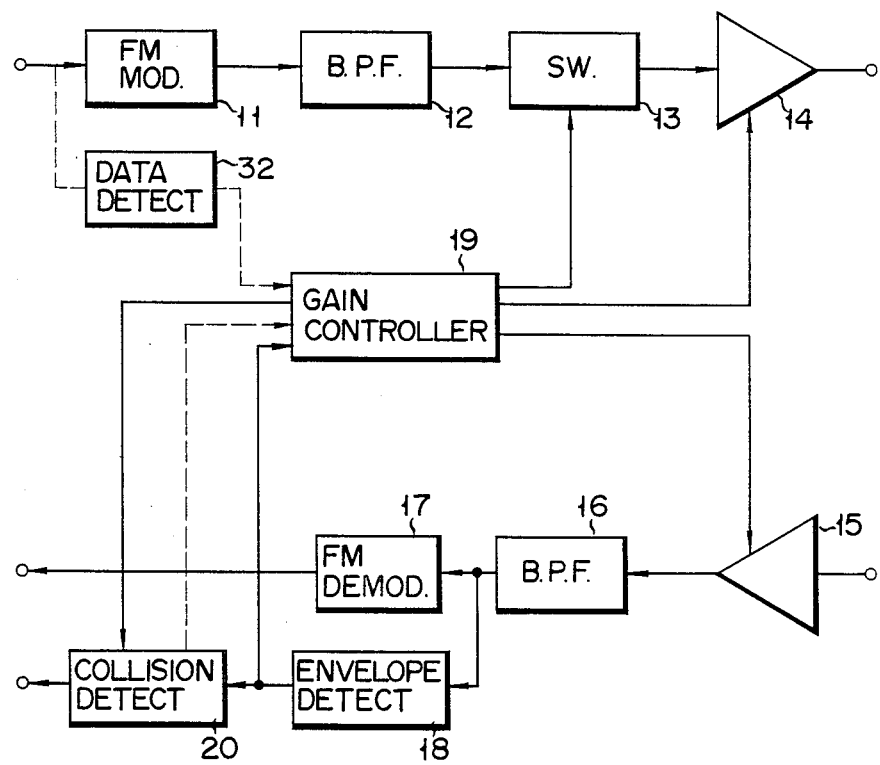
FIG. 2 is a block diagram of a modem used in the local network of FIG. 1.

The modem 5 has a construction as shown in FIG. 2. Data from the data processor 4 (which may be a baseband digital signal or code-modulated signal such as Manchester code signal) is coupled to a frequency modulator 11, to frequency modulate a carrier signal of a predetermined frequency in accordance with a frequency shift keying (FSK) system. The modulated-carrier signal is coupled through a bandpass filter 12 and an electronic switch 13 to a transmitting amplifier 14 to be amplified therein. The amplified signal is sent out to the transmission line 2.

A signal (i.e., modulated-carrier signal) transmitted from another modem is received by a receiving amplifier 15 to be amplified. The amplified received signal is coupled through a bandpass filter 16 to a frequency demodulator 17 to recover original digital data. The recovered digital data is fed to the data processor 4. The output signal of the bandpass filter 16 is also supplied to an envelope detector 18, which detects the level of the received signal. A gain controller 19 having a microcomputer adjusts the gains of transmitting and receiving amplifiers 14 and 15 according to the level of the received signal detected by envelope detector 18. The output signal of envelope detector 18 is also supplied to a collision detector 20. The collision detector 20 detects a collision of signals on the line by making use of the fact that a beat signal is generated as a result of a collision of signals. It generates a collision indicative signal when it detects a collision. The collision indicative signal is fed to data processor 4, which then inhibits the issuance of data. In this way, data transmission is effected according to the CSMA/CD system.

The gain controller 19 controls the electronic switch 13. For example, when the modem is not in a transmitting mode, the gain controller 19 disables switch 13 to prevent the carrier wave from being sent out to the transmitting line 2. Further, the gain controller 19 causes collision detector 20 to generate a collision indicative signal during a gain control operation. The detection of a collision is achieved after the gains of transmitting and receiving amplifiers 14 and 15 are adjusted to the respective optimum levels by gain controller 19.

Figure 3:
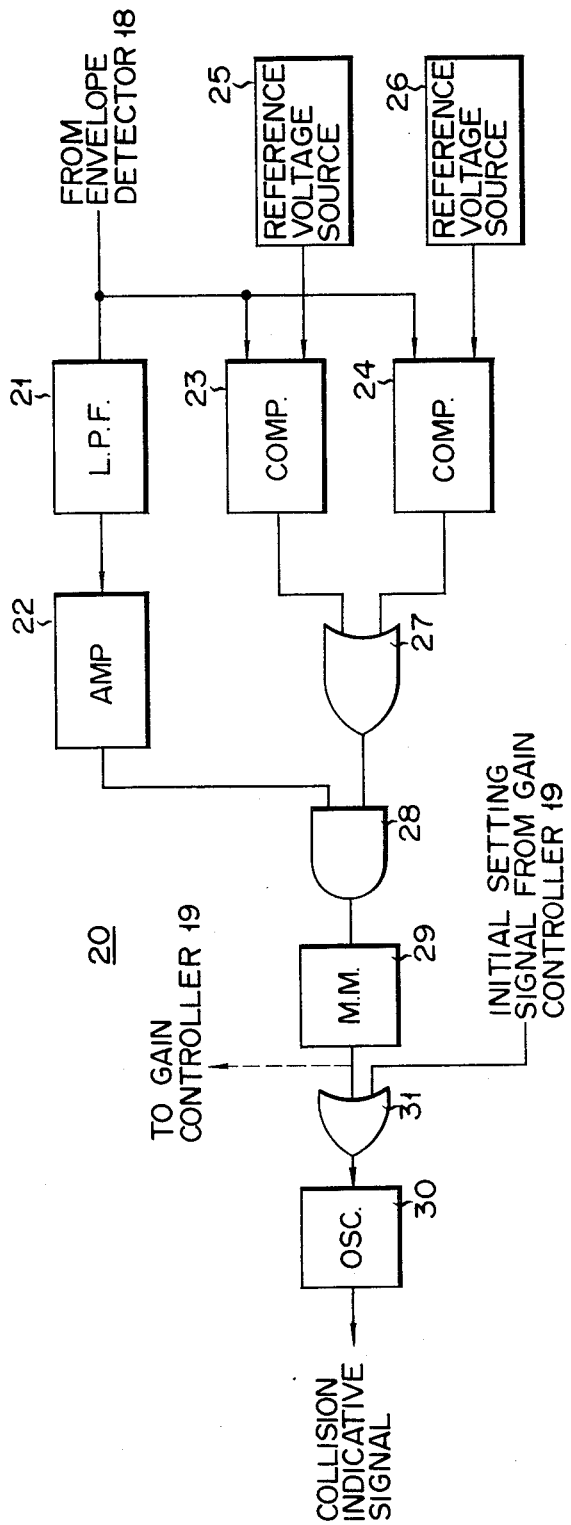
FIG. 3 is a block diagram of a collision detector in the modem of FIG. 3.

Before describing the gain control operation, the collision detector 20 will be described with reference to FIG. 3. The output signal of envelope detector 18 is fed through a low-pass filter 21 to an amplifier 22. It is also applied to first and second comparators 23 and 24. These comparators 23 and 24 check the level of received signal with respect to reference voltages provided from respective first and second reference voltage generators 25 and 26 as threshold levels. The first reference voltage generator 25 gives a threshold level, which is slightly higher than a substantially constant received signal level detected by envelope detector 18 when only one modem transmits a signal. The comparator 23 generates an output signal when the received signal level exceeds the threshold level. The second reference voltage generator 26 provides a threshold level, which is slightly lower than the substantially constant received signal level. The second comparator 24 generates a signal when the received signal level is lower than the threshold level. A collision of signals transmitted simultaneously from two or more modems, is thus detected by making use of the fact that the amplitude of a beat signal resulting from a collision varies from zero level to twice the level of each transmitted signal. The output signal of first and second comparators 23 and 24 are fed to a monostable multivibrator 29 through an OR gate 27 and an AND gate 28 which is enabled by an output signal of amplifier 22 only during the presence of the received signal. The monostable multivibrator 29 thus generates a collision detection signal having a predetermined duration when a collision is detected. The output signal of monostable multivibrator 29, which holds a collision detection state for a predetermined period of time, drives an oscillator 30, which generates a collision indicative signal of, for instance, 10 MHz. The gain controller 19 supplies an initial setting signal to oscillator 30 through an OR gate 31, whereby the collision indicative signal is generated during the gain control operation.

Figure 4:
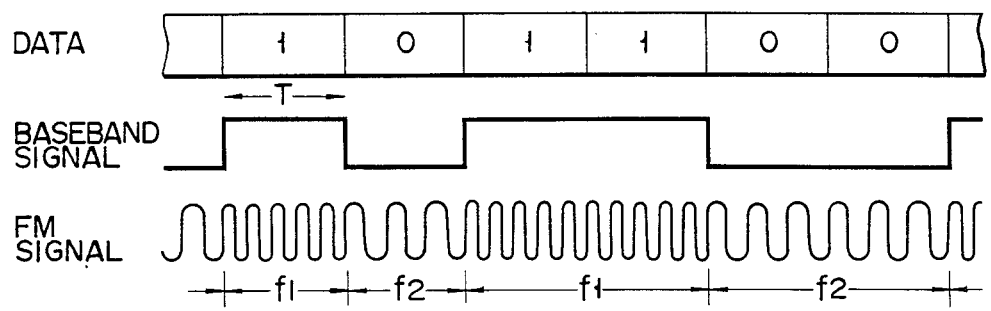
FIGS. 4 through 6 are diagrams for explaining a collision of signals occurring on the local network.

Now, a collision of signals transmitted simultaneously from different modems will be described with reference to FIGS. 4 to 6.

Assuming that transmission data applied from the data processor to the modem 5 in the network described above is a baseband signal as shown in FIG. 4, the frequency modulator 11 effects frequency shifts represented as follows:

$$f_1 = f_c + f_d$$

for transmission data of "1" (space), and $$f_2 = f_c - f_d$$

for transmission data of "0" (mark) where $f_c$ is the carrier frequency and $f_d$ is a frequency deviation.

Figure 5:
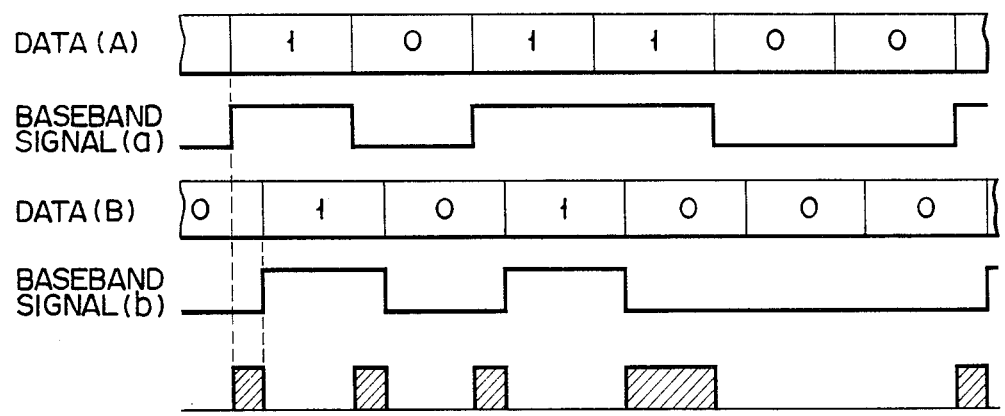
Figure 6:
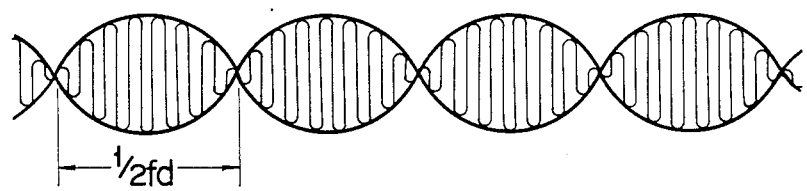

As shown in FIG. 5, when two modems transmit data with a time (or phase) difference $t_\phi$, signal differences result from the phase difference as shown by oblique-line portions. They also result from the difference in bit data. As a result of the signal differences, a beat signal with a cycle period of $f_d/2$, as shown in FIG. 6, is generated due to the upper and lower frequency components of $f_1$ and $f_2$. The peak amplitude of the beat signal is substantially double the amplitude of a normal signal transmitted from each modem. The collision detector 20 can detect a collision from the amplitude-varying beat signal.

Figure 7:
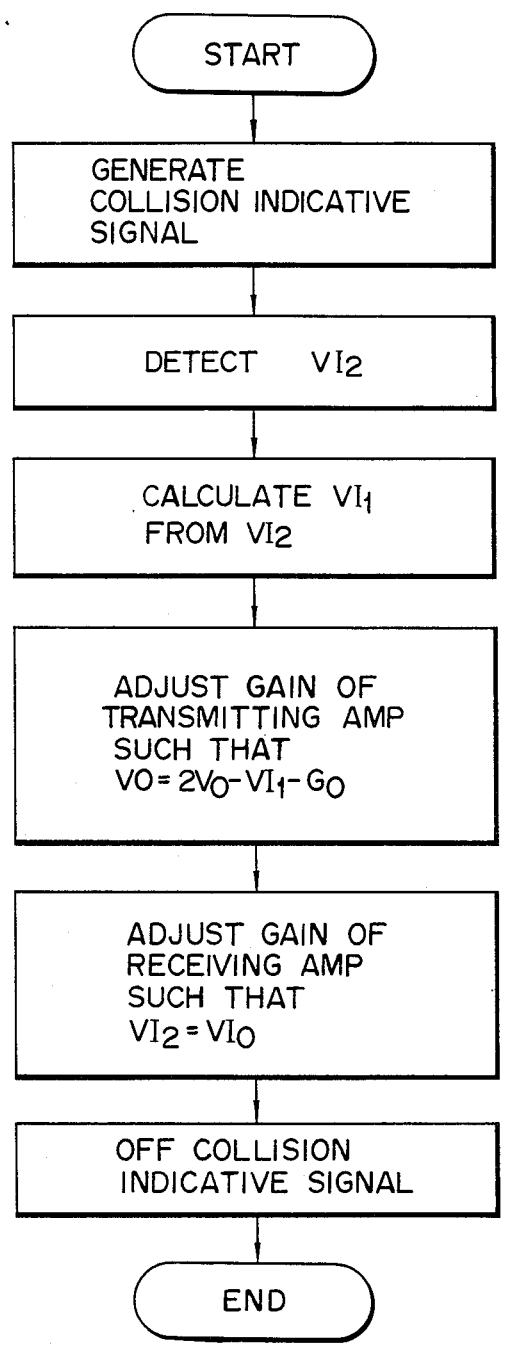
FIGS. 7 through 9 are flow charts for explaining the gain control operation of a gain controller in the modem of FIG. 2 for receiving and transmitting amplifiers.

The open-loop gain control operation will now be described with reference to a flow chart of FIG. 7. The gain control operation is initiated by turning on a power source of modem 5. First, the gain controller 19 supplies an initial setting signal to collision-indicative signal generator 30, thus inhibiting data transmission from data processor 4. The electronic switch 13 is disabled to prevent the transmission of carrier signal. The pilot signal generator 6 supplies the pilot signal of a predetermined reference level $V_0$ to headend at proper timings. Therefore, each modem 5 receives the pilot signal from the headend 3 via the reception line 2. The envelope detector 18 detects a reception level $VI_2$ of the pilot signal received by receiving amplifier 15. The gain controller 19 calculates an input level $VI_1$ of the pilot signal to modem 5 by subtracting the gain of receiving amplifier 15 from the detected reception level $VI_2$. The difference $V_0 - VI_1$ between the pilot signal level $V_0$ at headend 3 and input signal level $VI_1$ corresponds to the level of attenuation of signal on receiving line 2 from headend 3 to receiving modem 5. The level of attenuation of signal on transmission line 1 from the modem 5 to the headend 3 can be thought to be equal to the attenuation level $V_0 - VI_1$ of reception line. The gain controller 19 adjusts the gain of transmitting amplifier 14 according to the information mentioned above such that the level of a transmission signal from transmitting amplifier 14 which is obtained at head end 3 becomes equal to the reference level $V_0$ of the pilot signal, in other words, such that the output level $VO$ of transmitting amplifier 14 is obtained which satisfies the following equation, $$V_0 = VO - (V_0 - VI_1) + G_0$$

or $$VO = 2V_0 - VI_1 - G_0,$$

where $G_0$ is the gain of headend 3.

In the above example, the gain of transmitting amplifier of each modem is adjusted such that the level of a transmission signal from the modem becomes the reference level $V_0$ of the pilot signal at the headend. Therefore, since the envelope detector detects a reception level $VI_2$ of the pilot signal $V_0$ received by the receiving amplifier 15, the reception level of a transmission signal which has a value $V_0$ equal to the pilot signal at the head end will likewise have a reception level $VI_2$ at the receiving amplifier. But, according to this invention, it is only required that a signal from each modem have a constant level at the headend. For example, the signal from each modem may be adjusted to have, at the headend, a level which is a multiple of the reference level $V_0$ of the pilot signal. Namely, the transmitting amplifier may be adjusted such that $$VO = (1+a)V_0 - VI_1 - G_0$$

wherein a is an integer. However, a constant level at the head end can be obtained by making a in the above equation be a constant.

The gain controller 19 then adjusts the gain of receiving amplifier 15 such that the reception level $VI_2$ of the pilot signal becomes a predetermined reception level $VI_0$. Thus, the adjustment of the gains of transmitting and receiving amplifiers 14 and 15 is completed so that the collision indicative signal is turned off to permit data transmission from data processor 4.

According to this system, in which the gains of transmitting and receiving amplifiers 14 and 15 of each modem are adjusted as described above, the levels of transmission signals from modems 5 may be made equal at the headend 3, regardless of the position of each modem on the transmission line. In addition, the level of a signal received through the headend 3 can be adjusted to the level $VI_0$ suited for the receiving process. Sufficiently high quality of transmission signal thus can be obtained, while also permitting reliable detection of a collision of signals on the line from a signal level change. Further, the gains of transmitting and receiving amplifiers 14 and 15 can be adjusted very simply as described above and the construction of modem 5 is also simple, so that it is possible to realize a network readily and at a low cost.

The gain control operation described above is based only on the pilot signal from headend 3. However, it is possible to effect gain control on the basis of a signal transmitted from another modem, in which the gain control operation has been completed, as well as the pilot signal. Such gain control operation will now be described with reference to FIG. 8. For this gain control operation, a fact that a collision has occurred must be indicated from collision detector 20 to gain controller 19 as shown by a broken line in FIG. 2. This is achieved by coupling an output signal of monostable multivibrator 29, i.e., collision detection signal, to gain controller 19. Also in this case, the collision indicative signal is issued by turning on the power source of modem 5 to inhibit data processor 4 from data transmission and set it in a signal receiving stand-by condition. In this condition, the modem receives the pilot signal or a signal from another modem 5 in which the gain adjustment has been completed to detect the output level $VI_2$ of receiving amplifier 15. According to the output level $VI_2$ the gains of transmitting and receiving amplifiers 14 and 15 are adjusted as described above. Prior to the gain control, however, decision is made as to whether the received signal is the pilot signal or not. This decision is done by checking whether the duration of the received signal is longer or shorter than the longest packet duration $T_0$ of data packets transmitted between modems 5. If the received signal is found to be a signal from another modem 5, the reception level $VI_2'$ of the next data packet is detected, and a similar received signal duration check is done. If the received signal is the pilot signal, the gain adjustment is executed in the manner as described above using the second detected level $VI_2'$ as the received signal level $VI_2$. If the second received signal is also a signal from a modem 5, the difference $$|VI_2 - VI_2'|$$

is obtained, and a check is done as to whether the difference is less than a permissible value. If the former is less than the latter, it is decided that the level of the signal transmitted from the modem has been adjusted to a sufficiently high precision, and thus the signal level is used in lieu of the pilot signal level for executing the gain adjustment described above. If the difference is larger than the permissible value, the routine is repeated from the detection of the reception level so that the gain adjustment of transmitting and receiving amplifiers 14 and 15 is carried out after reception of a signal whose level may be considered to have been adjusted to a high precision.

Subsequently, the modem waits for a random period to avoid a collision with a signal from any other modem before sending out a test signal at the preset level VO, for instance for 3 msec. The test signal is a carrier signal used in the frequency modulator 11, which is transmitted while the electronic switch 13 is enabled by gain controller 19 for 3 msec. The modem then receives the test signal and detects the reception level $VI_2$ thereof. Then, a check is done as to whether the detection of signal level has been done under a condition free from a collision with a signal from another modem. For this purpose, after the lapse of a random period of time, the test signal of the preset level VO is retransmitted, and its reception level $VI_2'$ is detected. The difference in the reception level between the first and second test signals is then obtained, and a check is done as to whether the difference is less than the permissible value. If the difference is sufficiently small, it is decided that the test has been done without collision. At this time, the gain of transmitting amplifier 14 is adjusted such that the signal transmission level of the amplifier becomes $(VI_0 - VI_2)$ higher than the previous level VO. Upon completion of the re-adjustment of gain, the collision indicative signal is turned off to release the inhibition of data transmission, i.e., permit data transmission among modems 5.

The gain adjustment of transmitting and receiving amplifiers 14 and 15 through the closed-loop control using the test signal as described above permits a compensation for level control errors due to manufacturing variations in characteristics of trunk amplifiers, transmitting and receiving amplifiers 14 and 15 of each modem and transmission and reception lines 1 and 2. That is, it permits the initial setting of the level of a signal received by modem 5 with very high precision. In other words, the signal reception level which has been set to $VI_0$ may be actually $VI_2$ due to various errors, and the test using the test signal permits more precise gain adjustment and level setting by compensating the transmission level by an amount of $VI_0-VI_2$. This gain control operation is thus more effective and useful than the previous one.

The setting of the transmission level of the individual modems 5 of the network as described above permits a high quality signal transmission and reliable detection of a collision on the transmission line. However, the characteristics of the components of modems 5 and the transmission line may undergo changes with time so that the initially set level may no longer be suited to the network. Further, the characteristics may undergo with temperature change during the operation of the network, thus making the preset level inadequate. Therefore, it is desirable not only to make initial level setting at the time of turning on the power source but also constantly adjust the gains of transmitting and receiving amplifiers 14 and 15 even while data transmission is in force.

The constant gain control operation will now be described with reference to the flow chart of FIG. 9. For this control operation, a data detector 32, as shown in FIG. 2, is provided to detect the data from data processor to check whether the modem is in the transmitting mode. The output of detector 32 is fed to gain controller 19 as a transmission indicative signal. The data detector 32 consists of a retriggerable multivibrator which is responsive to the level transitions of Manchester code data from the data processor.

Figure 8:
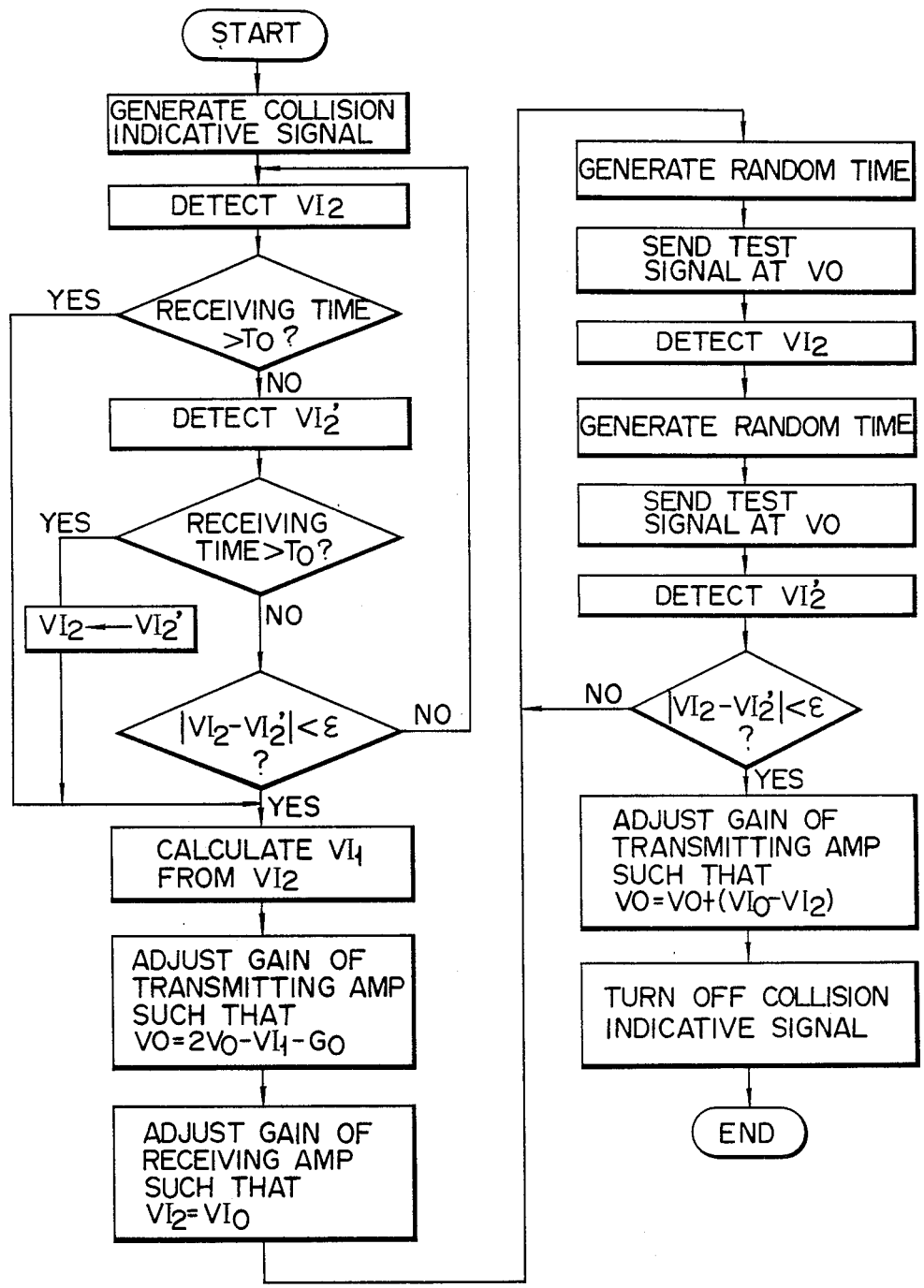
Figure 9:
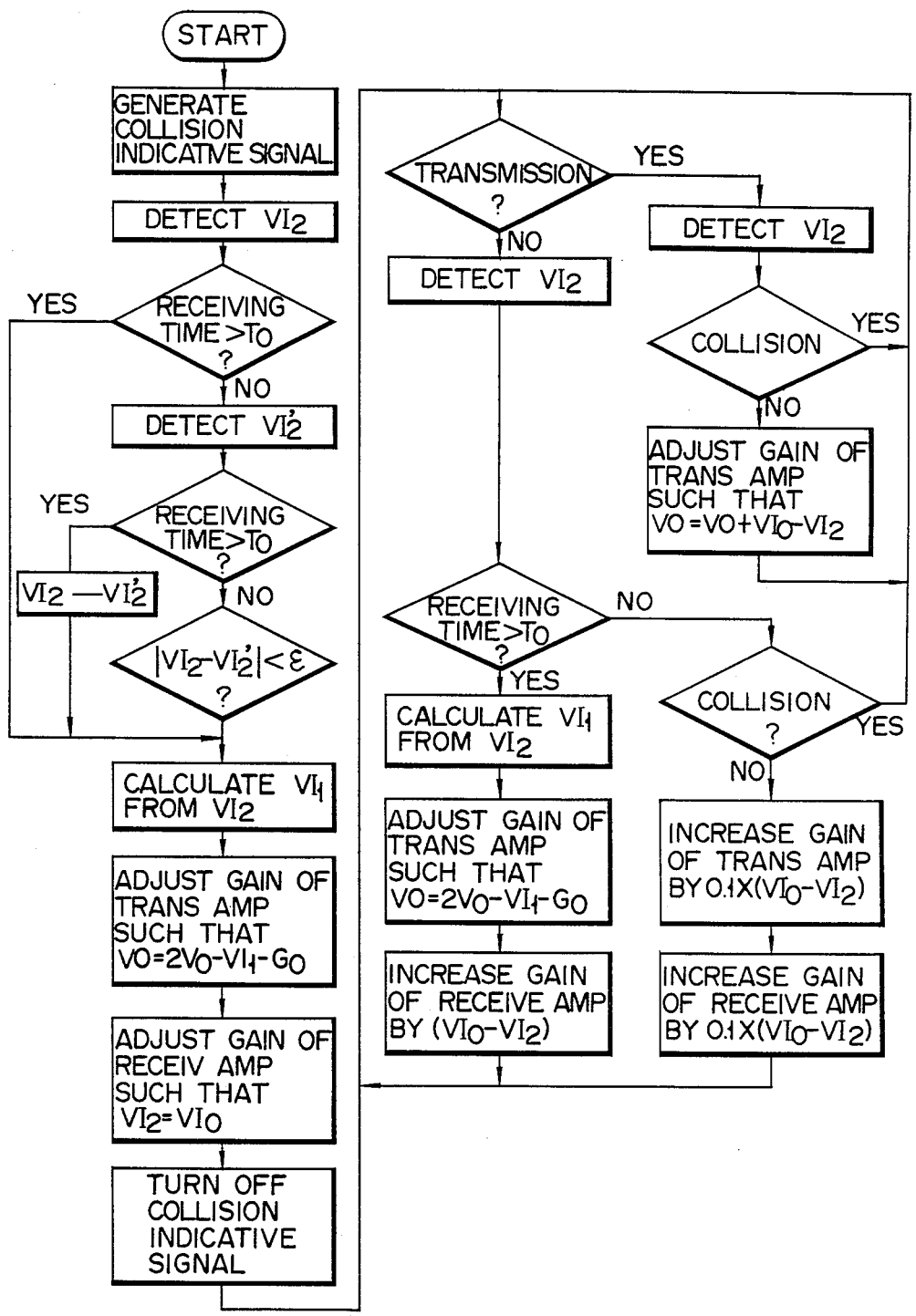

In the gain control operation shown in FIG. 9, initial control operation is executed in the same way as in the case of FIG. 8 when the power source is turned on. After the initial control operation is completed, a check is always done as to whether the modem is in the transmitting or receiving mode. In the receiving mode, when a signal is received the reception level $VI_2$ of the received signal is detected. A check is then done as to whether the received signal is the pilot signal or a signal transmitted from a modem on the basis of the duration of the received signal. If the received signal is the pilot signal, the gains of transmitting and receiving amplifiers 14 and 15 are adjusted in the manner as described before according to the reception level $VI_2$. Further, the gain of receiving amplifier 15 is compensated for according to the difference between the detected reception level $VI_2$ and the desired reception level $VI_0$. If the received signal is a signal from a modem, a collision detecting step is performed in the manner as described before. If it is decided that no collision has occurred, the gains of transmitting and receiving amplifiers 14 and 15 are increased by $0.1 \times (VI_0 - VI_2)$. This correction of gains is done in order to minimize adverse effects of possible maladjustment of the signal level at the other modem.

If the modem 5 is in the transmitting mode, the reception level $VI_2$ of a signal transmitted by itself is detected, and the occurrence of a collision is checked from the detected level $VI_2$. If it is decided that no collision has occurred, the gain of transmitting amplifier 14 is corrected according to the level difference $VI_0 - VI_2$ in the same manner as the gain adjustment using the test signal described above.

This control permits constant correction of the gains of transmitting and receiving amplifiers 14 and 15 while signal transmission among modems 5 is in force, that is, it can cope with changes in network characteristic with time and temperature change so that the signal transmission is always effected with the stable level.

In the above example, the pilot signal is used to adjust the gains of transmitting and receiving amplifiers. But, the gains of transmitting and receiving amplifiers may be adjusted using an output signal of a precisely arranged modem. Namely, if such a relation $|VI_2 - VI_2'| < \epsilon$ as described above is obtained for a signal from a predetermined modem, the signal from the modem may be used as a reference signal. In this case, an output signal from each modem is adjusted to have, at the headend, a level equal to the level of the output signal from the predetermined modem at the headend.

The gain controller 19 so far described requires an analog-to-digital converter for converting the output voltage of envelope detector 18 into a digital value and adjusts the gains of transmitting and receiving amplifiers 14 and 15 through calculation on the digital data. The calculated amplifier-gain control data is converted by a digital-to-analog converter into an analog control voltage for adjusting the transmitting and receiving amplifier gains. In this case, it is difficult to relate the calculated control voltage to the amplifier gains. In addition, the use of the analog-to-digital converter increases the modem's cost.

A preferred gain control system will be described hereinafter, which uses no analog-to-digital converter and achieves the gain control in accordance with the comparison of the envelope detector output voltage $V_D$ to a reference carrier voltage level $V_{CL}$ representing an envelope detector output voltage which is obtained when an optimum-level output signal is obtained from the receiving amplifier.

Figure 10:
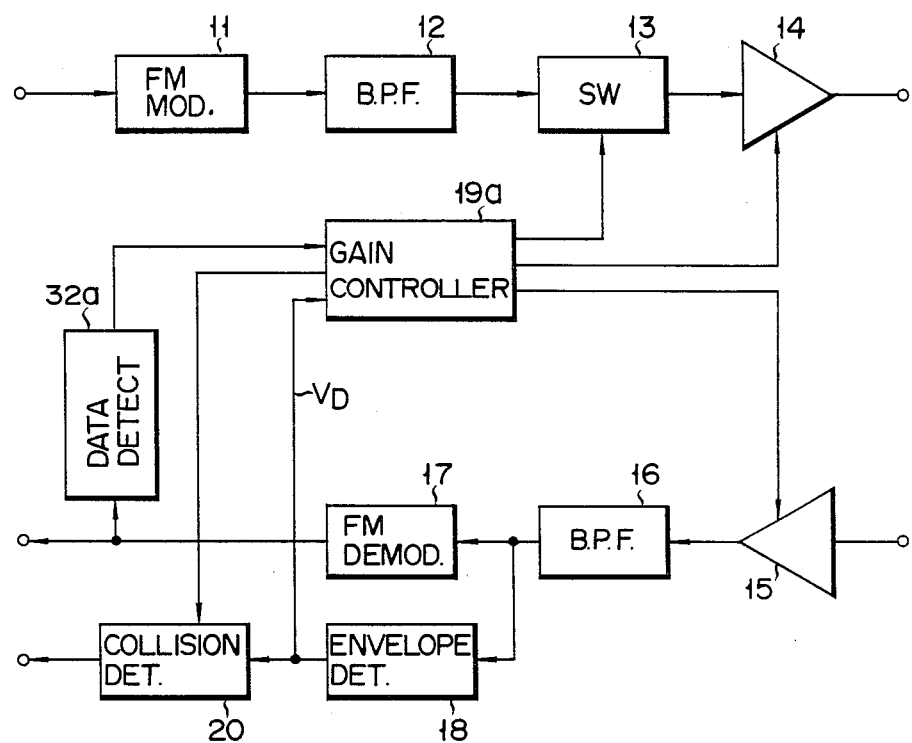
FIG. 10 shows a block diagram of a modem according to another embodiment of the invention.

FIG. 10 shows a construction of a modem which can perform the preferred gain control operation. In the Figure, the same parts as in the modem of FIG. 2 are designated by like reference numerals. In this embodiment, the gain control is executed according to the pilot signal and test signal as described above. The modem includes a data detector 32a provided on the output side of frequency demodulator 17. The output of frequency modulator 17 is normally high, and when data from another modem is received, the output of the demodulator 17 changes level in accordance with the received data. The output of data detector 32a is also normally high, and goes low in response to a level transition of the output of frequency modulator 17 to a low level. In other words, the output of data detector 32a is high when the modem is receiving the non-modulated pilot signal or test signal.

Figure 11:
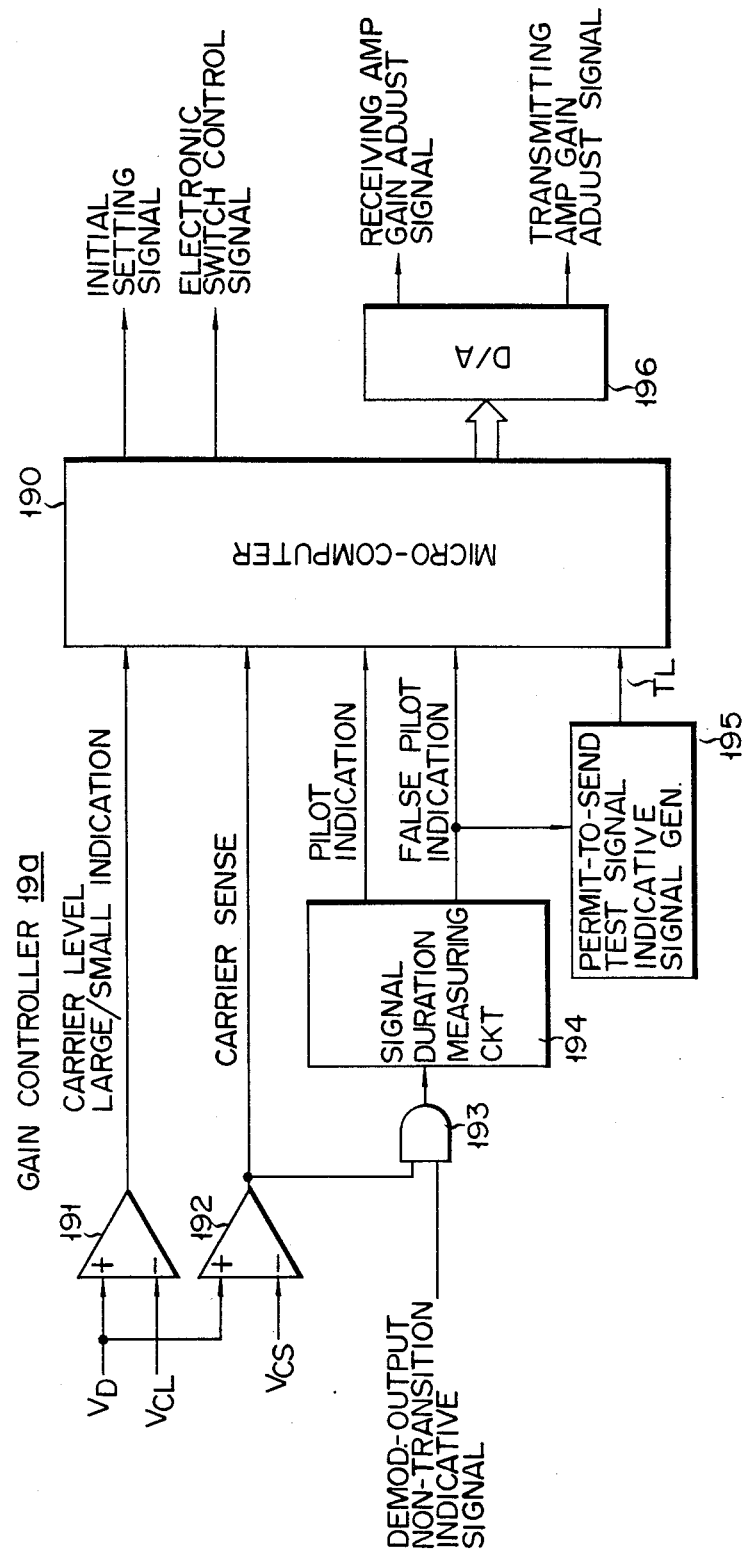
FIG. 11 is a block diagram of a gain controller shown in FIG. 10.

FIG. 11 shows a construction of gain controller 19a. A comparator 191 compares the output voltage $V_D$ of envelope detector 18 to a reference carrier voltage level $V_{CL}$ corresponding to the envelope detector output voltage when a proper level output signal is obtained from receiving amplifier 15. It supplies a carrier level large/small indication signal to a microcomputer 190. This signal is high when $V_D > V_{CL}$ while it is low when $V_D < V_{CL}$. A comparator 192 compares the output voltage $V_D$ of envelope detector 18 to a threshold voltage $V_{CS}$ for carrier signal detection which is lower than $V_{CL}$, to apply a carrier sense signal to microcomputer 190. The carrier sense signal is high when $V_D > V_{CS}$, i.e., when a rf signal of a relatively low level is received, and low when $V_D < V_{CS}$. The output of data detector 32a, i.e., demodulator output non-transition indicative signal, and the carrier sense signal are fed to an AND gate 193. When a rf signal with no data is received, the output of AND gate 193 goes high during the duration of the rf signal. The output of AND gate 193 is fed to a signal duration measuring circuit 194. The signal duration measuring circuit 194 measures the duration of the output signal of AND gate 193, which provides a pilot indication signal which goes high after the lapse of 3 msec. (i.e., the maximum duration of the test signal) and goes low when the output of AND gate 193 goes low. The signal duration measuring circuit 194 also provides a false pilot indication signal, which is normally high and goes low during a predetermined time (32 μsec.) when the output of AND gate 193 goes low after the lapse of 5 msec. When the output signal of AND gate 193 remains high even after the lapse of 5 msec. or goes low before the lapse of this time, the false pilot indication signal remains high. When a period corresponding to each modem has been passed after the false pilot indication signal became low, a permit-to-send test signal indicative signal generator 195 supplies a permit-to-send test signal indicative signal to microcomputer 190. The microcomputer 190 supplies amplifier gain control data to a digital-to-analog converter 196, which in turn feeds gain adjust signals to transmitting and receiving amplifiers 14 and 15. The microcomputer 190 also supplies a control signal to electronic switch 13 and an initial setting signal to collision detector 20.

Figure 12:
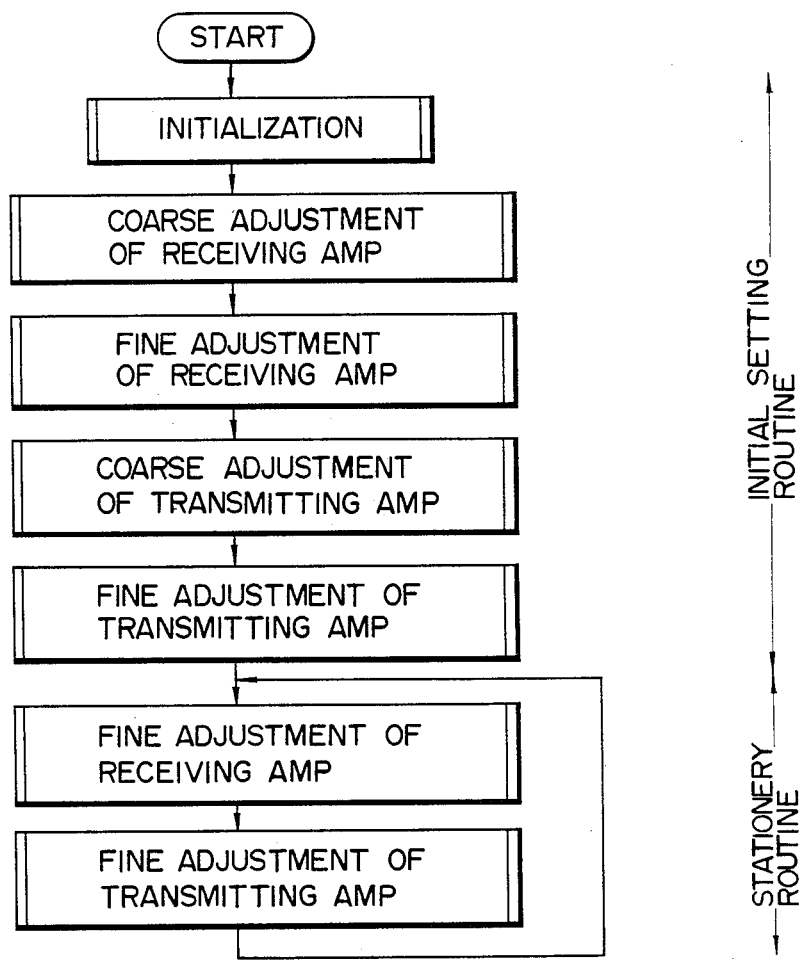

The gain control operation is performed following a routine as shown in a flow chart of FIG. 12. This routine includes an initial setting routine and a stationary routine. The initial setting routine is started with turning on of the power source of modem. First, a subroutine for initialization is executed. In this subroutine, an internal counter in the microcomputer is initialized, and an initial setting routine indicative flag bit is set to "1". Further, the collision indicative signal is supplied to data processor. Subsequently, subroutines for coarse adjustment of the receiving amplifier, fine adjustment thereof, coarse adjustment of the transmitting amplifier and fine adjustment thereof are executed in the mentioned order. The stationary routine includes subroutines for fine adjustments of the receiving and transmitting amplifiers. In the stationary routine, the fine adjustment of the transmitting amplifier may be executed once for, for example, 30 times of execution of the stationary routine.

The gain adjustment of the receiving amplifier is effected according to the pilot signal, while that of the transmitting amplifier is effected according to the test signal. The gain adjustments of the receiving and transmitting amplifiers will now be described with reference to flow charts of FIGS. 13 to 16.

Figure 13:
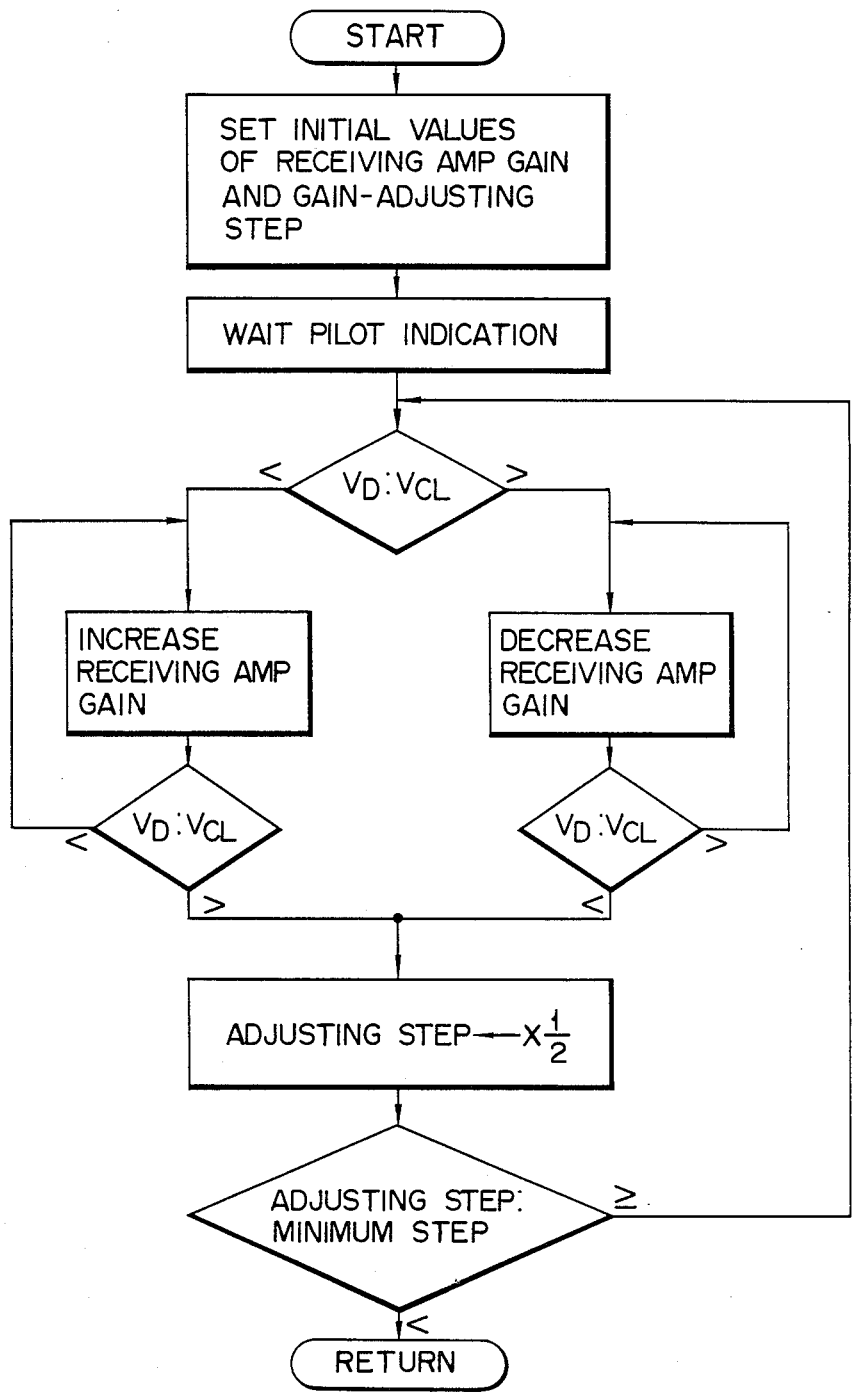

FIG. 13 illustrates the operation of the coarse gain adjustment of the receiving amplifier. The operation is initiated by turning on the power source of the modem. First, the gain of the receiving amplifier is adjusted to a relatively large initial value, and also an initial value of the gain adjusting step size is set. Where gain control data consists of 6 bits, a gain adjusting step size corresponding to the weight of the fourth least significant bit of the control data is initially set. The microcomputer 190 now waits the generation of the pilot indication signal from signal duration measuring circuit 194, indicating the reception of the pilot signal by the modem. When the modem receives a rf carrier signal, the comparator 192 provides a high level carrier sense signal in response to the output voltage $V_D$ of envelope detector 18 even if the amplitude of the received rf carrier signal is relatively small. As a result, the output of AND gate 193 goes high to cause signal duration measuring circuit 194 to measure the duration of the rf carrier signal. When the rf carrier signal continues for 3 msec., the signal duration measuring circuit 194 regards the rf carrier signal as the pilot signal and then generates the pilot indication signal. The output signal of comparator 192, i.e., the carrier level large/small indication signal, is high ("1") when $V_D > V_{CL}$ and low ("0") when $V_D < V_{CL}$. When $V_D < V_{CL}$, the microcomputer 190 increases the gain of receiving amplifier 15 at an interval of the initially set gain adjusting step size until $V_D > V_{CL}$. When $V_D > V_{CL}$, on the other hand, it decreases the receiving amplifier gain in the same steps until $V_D < V_{CL}$. This gain control operation is completed by an inversion of the carrier level large/small indication signal.

The microcomputer then halves the gain adjusting step size. Then a decision is made as to whether the new gain adjusting step size is greater or less than the minimum gain adjusting step size (corresponding to the weight of the least significant bit of the gain control data). If the former step size is greater than the latter, the operation goes back to the step of increasing or decreasing the gain according to the comparison between $V_D$ and $V_{CL}$. In this case, when the gain increasing operation is effected previously, the gain decreasing operation is effected at this time, and vice versa. When the gain adjusting step size is found to be less than the minimum gain adjusting step size, the subroutine of coarse adjustment is over, and the operation returns to the main routine.

Figure 14:
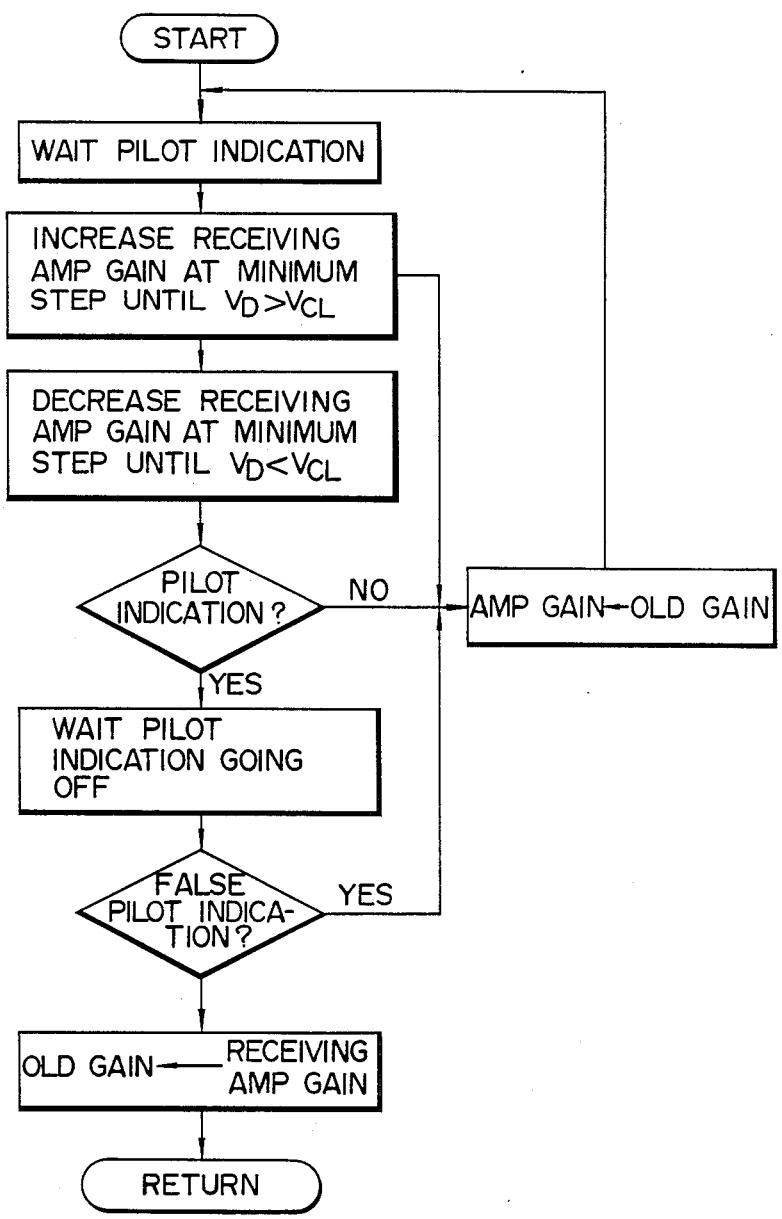

Now, the subroutine for the fine gain adjustment of the receiving amplifier is called to carry out the operation of FIG. 14. Like the previous case of coarse adjustment, the microcomputer 190 waits the pilot indication. When the pilot indication signal goes high, the microcomputer increases the gain of the receiving amplifier in the minimum gain adjusting step size until $V_D > V_{CL}$. This operation is carried out within 2 msec., during which period the pilot indication signal is high when the pilot signal is received. Therefore, after the completion of this operation a decision is made as to whether there is any pilot indication. If there is a pilot indication, the microcomputer waits the disappearance thereof. After the pilot indication has disappeared, a decision is made as to whether there is any false pilot indication. As mentioned above, when the pilot signal is received, the false pilot indication signal goes low for 32 msec. after the lapse of the pilot signal duration. This transition of signal signifies that there is no false pilot indication. If the duration of the output signal of AND gate 193 is shorter or longer than 5 msec., the false pilot indication signal remains high. This means that there is a false pilot indication.

If there is no false pilot indication, the receiving amplifier gain is adjusted such that $V_D = V_{CL}$. In the event if the pilot indication disappears due to noise or other causes during gain increasing operation or if there is no pilot indication after the gain increasing or decreasing operation, the above operation is repeated with the receiving amplifier gain set to an old gain before the fine adjustment operation. This also takes place when there is false pilot indication. When the fine adjustment of the receiving amplifier gain is completed, the operation returns to the main routine.

Now, the subroutine for the coarse gain adjustment of the transmitting amplifier is called to execute the operation of FIG. 15. First, initial values of the transmitting amplifier gain and gain adjusting step size are set. The microcomputer 190 waits a permission to send the test signal (TL). This signal is obtained when a time period corresponding to a modem number of each modem has been passed after the completion of the pilot signal reception. The microcomputer 190 then waits the disappearance of a carrier on the coaxial cable. This is detected by the output signal of comparator 192, i.e., carrier sense signal going low. When the permission to send test signal is obtained and the carrier on the coaxial cable disappears, the microcomputer 190 turns on electronic switch 13 to send out the test signal for 3 msec. at most in the manner as described before. The maximum value of signal propagation times which varies with the position of each modem on the network, is set to 40 $\mu$sec. The microcomputer 190 is in a stand-by condition during 40 $\mu$sec. after the issuance of the test signal. After 40 $\mu$sec. has passed, the microcomputer increases or decreases the gain of transmitting amplifier 15 in response to the carrier level large/small indication signal. More specifically, if the reception level $V_D$ of the test signal is less than the proper carrier level $V_{CL}$, the gain of the transmitting amplifier is increased in the intially set adjusting step size until $V_D > V_{CL}$. If $V_D °V_{CL}$, on the other hand, the gain is decreased in the same steps until $V_D < V_{CL}$. This adjustment of the transmitting amplifier gain is repeated while the permission to send test signal (TL) is issued. When the permission to send test signal vanishes during the gain adjustment operation, the electronic switch 13 is turned off, and the operation is repeated from the first step. The permission to send test signal usually continues for 3 msec.

When the step of increasing or decreasing the transmitting amplifier gain at an interval of the initial gain adjusting step size is over, the initial gain adjusting step size is halved. If the new gain adjusting step size is greater than the minimum one, the step of increasing or decreasing the gain is executed in the new gain adjusting step size. When this step is over, the gain adjusting step size is further halved. When the new gain adjusting step size is less than the minimum one, the operation returns to the main routine.

Figure 16:
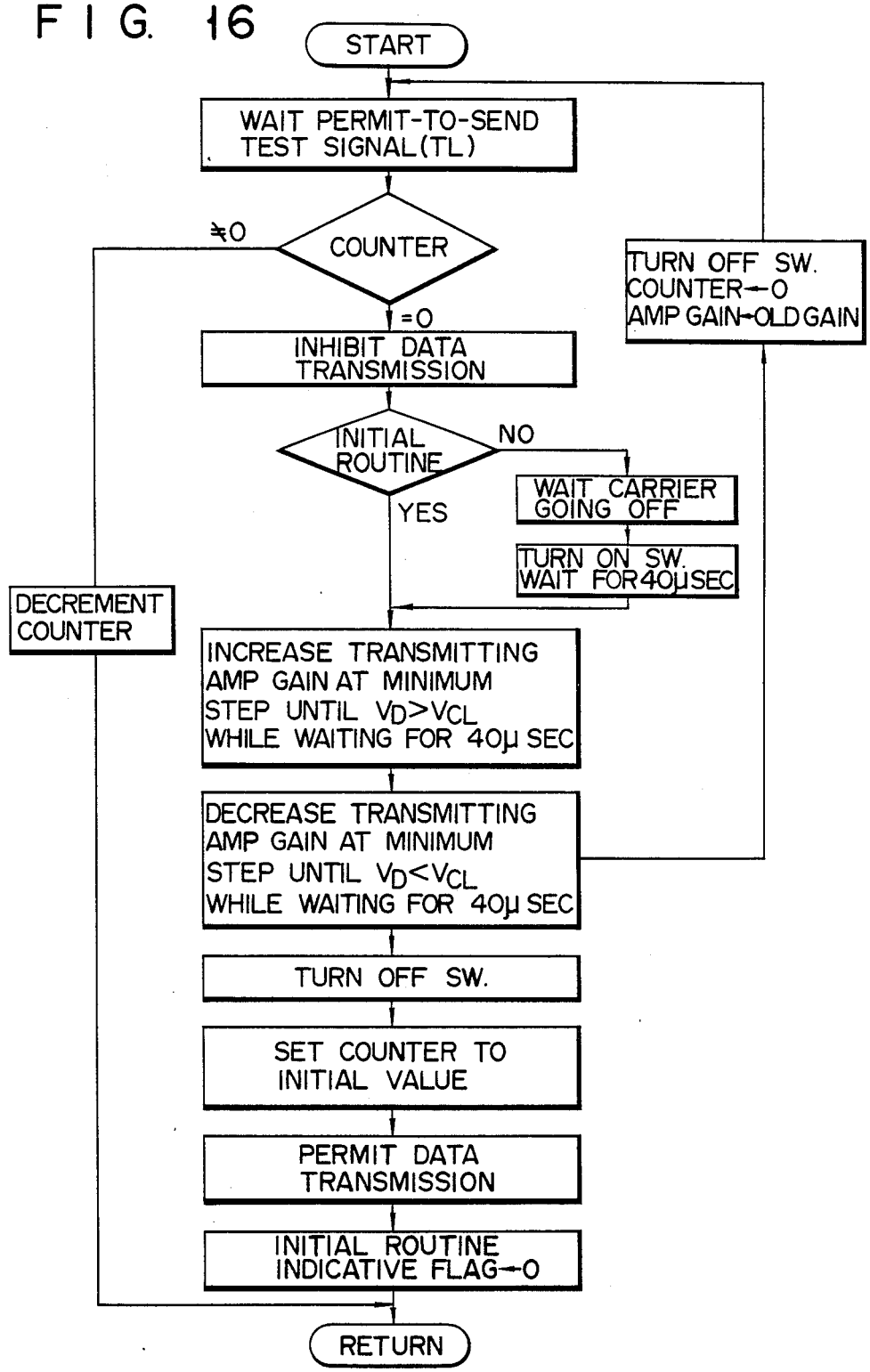

Now, the subroutine for the fine gain adjustment of the receiving amplifier is called to execute the operation of FIG. 16. The internal counter in the microcomputer have been reset to zero in the initialization subroutine described above. The zero internal counter content indicates that the fine gain adjustment of the transmitting amplifier is carried out. For the fine gain adjustment of the transmitting amplifier, the microcomputer 190 causes collision detector 20 to generate the collision indicative signal to inhibit data transmission from the data processor. Then, a decision is made as to whether the operation is in the initial setting routine. In the initialization subroutine, the flag bit has been set to "1" as described above. In the initial setting routine, the coarse and fine gain adjustments of the transmitting amplifier are performed continuously so long as the permission to send test signal is issued. In this routine, therefore, the operation of increasing and decreasing the transmitting amplifier gain at the interval of the minimum adjusting step size is executed continuously subsequent to the coarse gain adjustment. When the fine gain adjustment in the minimum adjusting step size is over, the microcomputer 190 turns off electronic switch 13, and sets an initial value, for instance 30, in the internal counter. Next, the microcomputer permits data transmission and resets the initial setting routine indicative flag. This brings an end to the initial setting routine, and the operation returns to the main routine.

When the permit-to-send test signal indicative signal (TL) goes off during the step of increasing or decreasing the transmitting amplifier gain in the minimum adjusting step for the fine gain adjustment, the microcomputer 190 turns off the electronic switch 13, resets the internal counter to zero and sets the transmitting amplifier gain to the old gain obtained immediately after the end of the coarse adjustment. The operation is repeated from the step to wait the permission to send test signal.

In the stationary routine, the subroutines for the fine gain adjustments of the receiving and transmitting amplifiers are executed. The fine gain adjustment of the transmitting amplifier, however, is executed once for 30 times of that of the receiving amplifier in accordance with the initial value (30) of the internal counter. In the stationary routine whenever the fine gain adjustment subroutine for the transmitting amplifier is called from the main routine, the internal counter is decremented by 1.

The fine adjustment of transmitting amplifier in the stationary routine starts with a step of waiting the permission to send test signal. Since the initial setting routine indicative flag has been reset for the stationary routine, the fine adjustment of the transmitting amplifier in the minimum adjusting step size is started after any signal transmitted from any other modem has gone off on the coaxial cable and the electronic switch 13 has been turned on.

Figure 17:
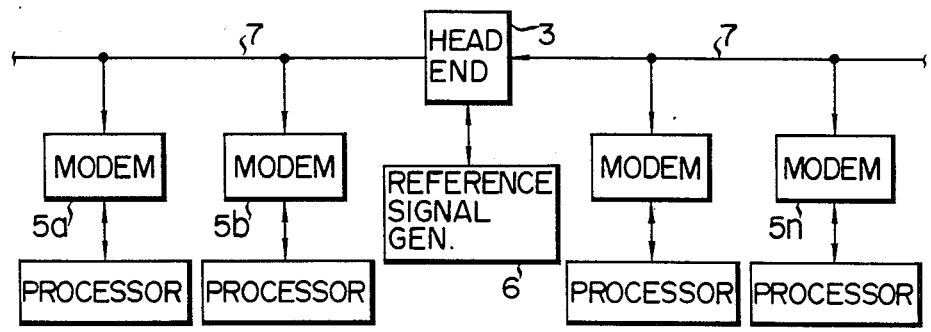
FIG. 17 shows a local network using a single-conductor cable.
Figure 18:
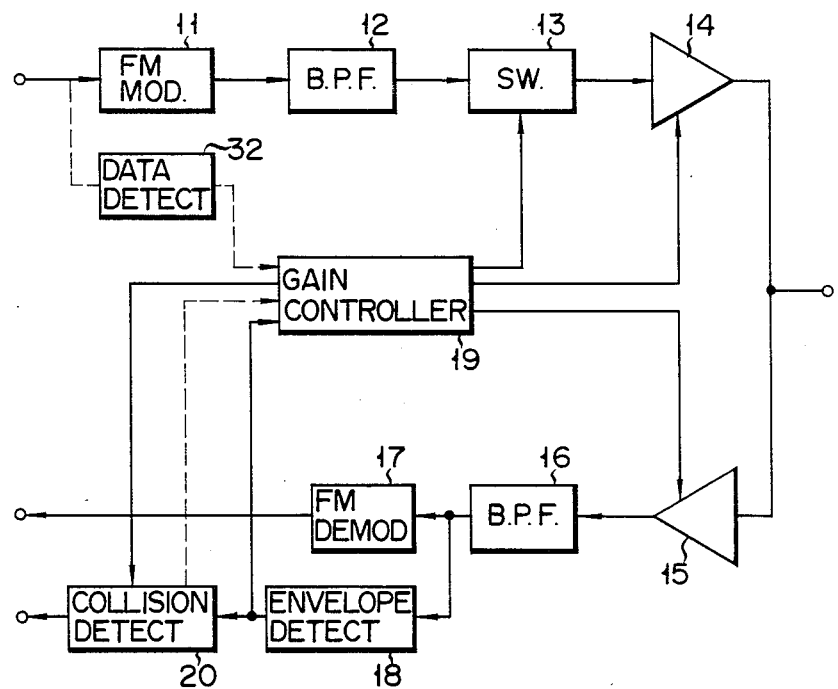
FIGS. 18 and 19 are block diagrams of a modem and a headend used in the network of FIG. 17, respectively.

The invention may be applied to a single-conductor cable network as shown in FIG. 17. In this network, data are transmitted and received among modems using frequency division multiplexing. In this instance, each modem 5 is basically the same as that shown FIG. 2. However, as shown in FIG. 18, the output line of transmitting amplifier 14 and input line of receiving amplifier 15 are connected together. The transmitting and receiving amplifiers 14 and 15 are connected through a directional coupler having a frequency selection property.

Figure 19:
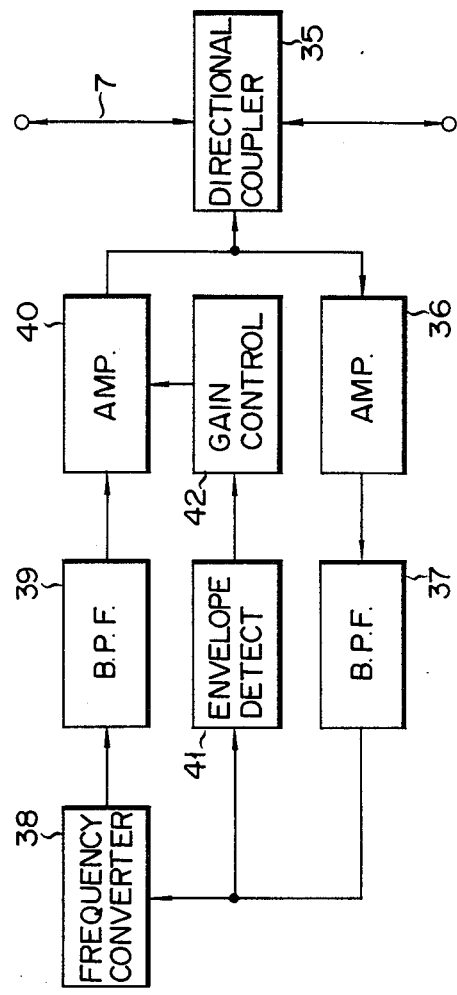

Further, head end 3 in this network may have a construction as shown in FIG. 19. A receiving amplifier 36 is coupled by a directional coupler 35 to a transmission line 7. A signal received by receiving amplifier 36 is coupled through a band-pass filter 37 to a frequency converter 38. A frequency-conversion output signal of frequency converter 38 is coupled through a band-pass filter 39 to a transmitting amplifier 40, the output of which is in turn coupled to directional coupler 35. An envelope detector 41 detects the output level of band-pass filter 37, and a gain controller 42 adjusts the gain of transmitting amplifier 40 according to the output of the envelope detector 41 to make the transmission and reception signal levels equal to each other in headend 3.

With the single-conductor cable network as described a signal transmission is carried out principally in the same manner as in the double-conductor cable network as described before. This means that the same gain control system as described above may be used.

While some preferred embodiments of the invention have been described above, they are not intended to limit the scope of the invention. For example, the invention is also applicable to a network using optical fiber cables for the transmitting and receiving lines where light is the medium of data transmission. Further, a signal to be transmitted may be of any type, e.g., video and audio analog or digital signal, or it may be a base-band signal. Further, where a carrier signal is used, it may be modulated by any suitable modulation system. Further, the network may be star-shaped. Namely, this invention may be applied to any communication line having a transmission path and a reception path and means for coupling information signals present on the transmission path to the reception path at a predetermined point of the communication line. Still further, one modem may be provided with the function of pilot signal generator. Moreover, the pilot signal may be discriminated from its frequency.

What is claimed is:

1. An information transmission system comprising:

a communication line having a transmission path and a reception path and means for coupling information signals present on said transmission path to said reception path at a predetermined point of said line;

a plurality of information processing devices;

a plurality of modems for coupling said information processing devices to said communication line at arbitrary points thereof and for permitting transmission and reception of information signals among said information processing devices through said communication line, each modem including a transmitting amplifier to transmit an information signal from a corresponding information processing device to said transmission path of said communication line and a receiving amplifier to receive an information signal transmitted to said transmission path by any of said modems through said predetermined coupling point of said transmission and reception paths and said reception path;

a pilot signal providing means for sending out to said communication line a pilot signal of a predetermined reference level which is capable of being received by said receiving amplifier of each of said modems; and each of said modems further including:

reception level detecting means coupled to said receiving amplifier for detecting the reception level of a signal received through said reception path; and gain adjusting means responsive to said reception level detecting means for adjusting the gain of said transmitting amplifier such that the reception level of a transmission signal, which is transmitted to said transmission path by said transmitting amplifier and received by said receiving amplifier through said predetermined coupling point of said transmission and reception paths and through said reception path, becomes substantially equal to the reception level of the pilot signal received by said receiving amplifier.

2. An information transmission system according to claim 1, wherein the pilot signal is an unmodulated signal.

3. An information transmission system according to claim 1, wherein said gain adjusting means is arranged to adjust the gain of said receiving amplifier so that the reception level of the pilot signal becomes a predetermined level.

4. An information transmission system according to claim 1, wherein the transmission signal used in adjusting the gain of said transmitting amplifier is a test signal.

5. An information transmission system according to claim 4, wherein the test signal is an unmodulated signal.

6. An information transmission system according to claim 1, comprising:

said coupling means implemented by having said transmission path and said reception path of said communication line constituted by a common transmission medium; and a frequency conversion device provided at said coupling point of said transmission and reception paths for effecting information transmission among said modems on a frequency division multiplexing basis.

7. An information transmission system according to claim 1, comprising:

said transmission and reception paths constituted by a pair of mediums; and said coupling means comprising a head end provided at said predetermined coupling point of said transmission and reception paths.

8. An information transmission system comprising:

a communication line having a transmission path and a reception path and means for coupling information signals present on said transmission path to said reception path at a predetermined point of said line;

a plurality of information processing devices;

a plurality of modems for coupling said information processing devices to said communication line at arbitrary points thereof and for permitting transmission and reception of information signals among said information processing devices through said communication line, each modem including a transmitting amplifier to transmit an information signal from a corresponding information processing device to said transmission path of said communication line and a receiving amplifier to receive an information signal transmitted to said transmission path by any of said modems through said predetermined coupling point of said transmission and reception paths and said reception path;

a pilot signals providing means for sending out to said communication line a pilot signal of a predetermined reference level which is capable of being received by said receiving amplifier of each of said modems; and each of said modems further including:

reception level detecting means coupled to said receiving amplifier for detecting the reception level of a signal received through said reception path; and gain adjusting means responsive to said reception level detecting means for adjusting the gain of said transmitting amplifier such that the reception level of a transmission signal, which is transmitted to said transmission path by said transmitting amplifier and received by said receiving amplifier through said predetermined coupling point of said transmission and reception paths and through said reception path, becomes a predetermined level which is a function of the reception level of the pilot signal received by said receiving amplifier.

9. An information transmission system comprising:

a communication line having a transmission path and a reception path and means for coupling information signals present on said transmission path to said reception path at a predetermined point of said line;

a plurality of information processing devices;

a plurality of modems for coupling said information processing devices to said communication line at arbitrary points thereof and for permitting transmission and reception of information signals among said information processing devices through said communication line, each modem including a transmitting amplifier to transmit an information signal from a corresponding information processing device to said transmission path of said communication line and a receiving amplifier to receive an information signal transmitted to said transmission path by any of said modems, through said predetermined coupling point of said transmission and reception paths and through said reception path;

a pilot signal providing means for sending out to said coupling point of said communication line a pilot signal of a predetermined reference level which is capable of being received by said receiving amplifier of each of said modems; and each of said modems further including:

reception level detecting means coupled to said receiving amplifier for detecting the reception level of a signal received through said reception path; and gain adjusting means responsive to said reception level detecting means for adjusting the gain of said transmitting amplifier such that a transmission signal, which is transmitted to said transmission path by said transmitting amplifier, has, at said coupling point of said communication line, a predetermined level which is a function of the reference level of the pilot signal at said coupling point.

10. An information transmission system comprising:

a communication line having a transmission path and a reception path and means for coupling information present on said transmission path to said reception path at a predetermined point of said line;

a plurality of information processing devices;

a plurality of modems for coupling said information processing devices to said communication line at arbitrary points thereof and for permitting transmission and reception of information signals among said information processing devices through said communication line, each modem including a transmitting amplifier to transmit an information signal from a corresponding information processing device to said transmission path of said communication line and a receiving amplifier to receive an information signal transmitted to said transmission path by each of said modems, through said predetermined coupling point of said transmission and reception paths and through said reception path;

a pilot signal sending means for sending out to said communication line an unmodulated pilot signal of a predetermined reference level which is capable of begin received by said receiving amplifier of each of said modems; and each of said modems further including:

reception level detecting means coupled to said receiving amlifier for detecting the reception level of a signal received through said reception path;

test signal sending means for sending an unmodulated test signal to said transmission path through said transmitting amplifier;

unmodulated signal detecting means for detecting that a signal received by said receiving amplifier is the pilot signal or the test signal; and gain adjusting means responsive to said reception level detecting means and said unmodulated signal detecting means for, when the reception level of the pilot signal received by said receiving amplifier is detected, causing said test signal sending means to send out a test signal to said transmission path and adjusting the gain of said transmitting amplifier such that the reception level of the test signal received by said receiving amplifier through said predetermined point of said communication line becames substantially equal to the reception level of the pilot signal received by said receiving amplifier.

11. An information transmission system according to claim 10, wherein said gain adjusting means is arranged to adjust the gain of said receiving amplifier so that the reception level of the pilot signal becomes a predetermined level.

12. An information transmission system according to claim 10, wherein said gain adjusting means is arranged to perform an initial routine for gain adjustments of said transmitting and receiving amplifiers, and a stationary routine for gain adjustments of said transmitting and receiving amplifiers, said stationary routine being repeatedly executed during the operation of the modem such that the gain adjustment of said transmitting amplifier is effected once for plural times of that of said receiving amplifier.

13. An information transmission system according to claim 10, wherein said gain adjusting means is arranged to adjust the gain of said receiving amplifier so that the reception level of the pilot signal becomes a predetermined level, and to successively effect a coarse gain adjustment of said receiving amplifier, fine gain adjustment thereof, coarse gain adjustment of said transmitting amplifier and fine gain adjustment thereof, each of the coarse gain adjustments being carried out such that the gain of the corresponding amplifier is adjusted by a coarse adjusting step size, the gain adjusting step size being switched to a smaller step size every time a magnitude relation between the reception level of the pilot signal or the test signal and the predetermined reception level is changed, and each of the fine gain adjustmens being carried out such that the gain of the corresponding amplifier is adjusted by a smaller adjusting step size than those in the coarse gain adjustments.

14. An information tramsmission system according to claim 13, wherein said gain adjusting means is arranged to perform an initial routine and a stationary routine, said initial routine including subroutines for a coarse gain adjustment of said receiving amplifier, fine gain adjustment thereof, coarse gain adjustment of said transmitting amplifier and fine gain adjustment thereof, said stationary routine including subroutines for fine gain adjustments of said receiving and transmitting amplifiers and being repeatedly executed during the operation of the modem, and the fine gain adjustment of said transmitting amplifier in the stationary routine being effected once for a plurality of times of the fine gain adjustment of said receiving amplifier.

15. An information transmission system according to claim 10, comprising:
said coupling means implemented by having said transmission and reception paths of said communication line constituted by a common transmission medium; and
a frequency conversion device provided at said coupling point of said transmission and reception paths for effecting information transmission among said modems on a frequency multiplexing basis.

16. An information transmission system according to claim 10, comprising:
said transmission and reception paths of said communication line constituted by a pair of transmission mediums; and
said coupling means comprising a head end provided at said predetermined coupling point of said transmission and reception paths.

17. An information transmission system according to claim 10, wherein the pilot signal, test signal, and information signal have different durations, and said unmodulated signal detecting means is arranged to discriminate between the pilot signal and test signal on the basis of signal duration.

18. An information transmission system comprising:
a communication line having a transmission path and a reception path and means for coupling information signals present on said transmission path to said reception path at a predetermined point of said line;
a plurality of information processing devices;
a plurality of modems for coupling said information processing devices to said communication line at arbitrary points thereof and for permitting transmission and reception of information signals among said information processing devices through said communication line, each modem including a transmitting amplifier to transmit an information signal from a corresponding information processing device to said transmission path of said communication line and a receiving amplifier to receive an information signal transmitted to said transmission path by each of said modems through said predetermined coupling point of said transmission and reception paths and through said reception path;
reception level detecting means coupled to said receiving amplifier for detecting the reception level of a signal received through said reception path; and
gain adjusting means responsive to said reception level detecting means for adjusting the gain of said transmitting amplifier such that the reception level of a transmission signal, which is transmitted to said transmission path by said transmitting amplifier and received by said receiving amplifier through said predetermined coupling point of said transmission and reception paths and through said reception path, becomes substantially equal to the reception level of a signal transmitted from another modem and received by said receiving amplifier.

19. An information transmission system according to claim 18, further comprising:
pilot signal providing means coupled to said communication line for sending out a pilot signal of a predetermined level to said communication line so that the pilot signal can be received by said receiving amplifier of each of said modems through said reception path;
each of said modems further comprising means for detecting whether a signal received by said receiving amplifier is the pilot signal or a signal transmitted by another modem; and
said gain adjusting means arranged to adjust the gain of said transmitting amplifier according to the reception level of the pilot signal when the pilot signal is received by said receiving amplifier.

20. An information transmission system according to claim 18, wherein said gain adjusting means is arranged to adjust the gain of said receiving amplifier so that the reception level of the signal received by said receiving amplifier becomes a predetermined level.

21. An information transmission system according to claim 18, wherein said gain adjusting means is arranged to adjust the gain of said transmitting amplifier when the difference between the reception levels of signals transmitted from another modem and received by said receiving amplifier is smaller than a predetermined value.

22. An information transmission system according to claim 18, wherein each of said modems includes a test signal sending means for sending out a test signal to said communication line through said transmitting amplifier; and wherein said gain adjusting means is arranged to cause said test signal sending means to send out the test signal to said communication line after the gain of said transmitting amplifier has been adjusted, and compensate the gain of said transmitting amplifier according to the reception level of the test signal received by said receiving amplifier.

23. An information transmission system according to claim 18, comprising:

said coupling means inplemented by having said transmission path and said reception path constituted by a common transmission medium; and a frequency conversion device provided at said coupling point of said transmission and reception paths for effecting information transmission amoung said modems on a frequency multiplexing basis.

24. An information transmission system according to claim 18, comprising:

said transmission path and said reception path of said communication line constituted by a pair of transmission mediums; and said coupling means comprising a head end provided at said predetermined coupling point of said transmission and reception paths.

25. In an information transmission system comprising a communication line having a transmission path and a reception path and means for coupling information signals present on said transmission path to said reception path at a predetermined point of said line, a plurality of information processing devices, a plurality of modems for coupling said information processing devices to said communication line at arbitrary points thereof and for effecting information transmission among said information processing devices through said communication line, each modem including a transmitting amplifier to transmit an information signal from a corresponding information processing device to said transmission path of said communication line, and a receiving amplifier to receive an information signal transmitted to said transmission path by any of said modems through said coupling point of said transmission and reception paths and through said reception path, a method of causing each of said modems to receive information signals from other modems at a substantially constant level, comprising the steps of:

providing a pilot signal of a reference level to a predetermined point of said communication line;

detecting the reception level of the pilot signal received by said receiving amplifier;

sending a transmission signal to said communication line through said transmitting amplifier;

receiving the transmission signal sent out to said communication line by said receiving amplifier through said coupling point of said communication line and said reception path; and adjusting the gain of said transmitting amplifier such that the reception level of the transmission signal received by said receiving amplifier becomes substantially equal to the reception level of the pilot signal received by said receiving amplifier.

26. A method according to claim 25, further comprising the step of adjusting the gain of said receiving amplifier to a level suitable for signal processing.

27. A method according to claim 25, wherein the pilot signal is provided to said coupling point of said communication line.

28. A method according to claim 25, wherein the transmission signal is a test signal, and the pilot signal and the test signal are unmodulated signals.

29. A method according to claim 28, wherein the pilot signal and the test signal have different durations.

30. In an information transmission system comprising a communication line having a transmission path and a reception path and means for coupling information signals present on said transmission path to said reception path at a predetermined point of said line, a plurality of information processing devices, a plurality of modems for coupling said information processing devices to said communication line at arbitrary points thereof and for effecting information transmission among said information processing devices through said communication line, each modem including a transmitting amplifier to transmit an information signal from a corresponding information processing device to said transmission path of said communication line, and a receiving amplifier to receive an information signal transmitted to said transmission path by any of said modems through said coupling point of said transmission and reception paths and through said reception path, a method of causing each of said modems to receive information signals from other modems at a substantially constant level, comprising the steps of:

receiving by said receiving amplifier an information signal transmitted from a predetermined modem to said communication line through said coupling point of said communication line and said reception path;

detecting the reception level of the information signal from said predetermined modem received by said receiving amplifier;

transmitting a transmission signal to said communication line through said transmitting amplifier;

receiving the transmission signal by said receiving amplfier through said coupling point of said communication line and said reception path; and adjusting the gain of said transmitting amplifier such that the reception level of the transmission signal becomes substantially equal to the reception level of the information signal transmitted from said predetermined modem.

* * * * *